(12) United States Patent
Hanrieder

(10) Patent No.: US 11,954,743 B2
(45) Date of Patent: Apr. 9, 2024

(54) HARVEST LOGISTICS

(71) Applicant: AGCO International GmbH, Neuhausen (CH)

(72) Inventor: Florian Hanrieder, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 542 days.

(21) Appl. No.: 17/269,372

(22) PCT Filed: Aug. 14, 2019

(86) PCT No.: PCT/EP2019/071867
§ 371 (c)(1),
(2) Date: Feb. 18, 2021

(87) PCT Pub. No.: WO2020/038810
PCT Pub. Date: Feb. 27, 2020

(65) Prior Publication Data
US 2022/0122197 A1    Apr. 21, 2022

Related U.S. Application Data

(60) Provisional application No. 62/721,011, filed on Aug. 22, 2018.

(51) Int. Cl.
| | |
|---|---|
| *G06Q 50/02* | (2012.01) |
| *A01D 41/127* | (2006.01) |
| *G05D 1/00* | (2006.01) |

(52) U.S. Cl.
CPC ......... *G06Q 50/02* (2013.01); *A01D 41/1271* (2013.01); *A01D 41/1275* (2013.01); *G05D 1/0044* (2013.01)

(58) Field of Classification Search
CPC ......... G05D 2201/0201; G05D 1/0044; A01D 1/0044; A01D 41/1275; G06Q 50/02
(Continued)

(56) References Cited

U.S. PATENT DOCUMENTS

| | | | |
|---|---|---|---|
| 7,480,564 B2* | 1/2009 | Metzler | A01B 69/007 |
| | | | 701/50 |
| 2006/0271262 A1* | 11/2006 | McLain, III | G06Q 10/06 |
| | | | 701/50 |

(Continued)

FOREIGN PATENT DOCUMENTS

| | | |
|---|---|---|
| EP | 2 902 957 A1 | 8/2015 |
| EP | 2 950 169 A1 | 12/2015 |

(Continued)

OTHER PUBLICATIONS

European Patent Office, International Search Report for parent International Application No. PCT/EP2019/071867, dated Sep. 27, 2019.

*Primary Examiner* — Yazan A Soofi

(57) ABSTRACT

A system comprises a first portable electronic device associated with an agricultural harvester and a second portable electronic device associated with a crop transport vehicle. At least one of the first portable electronic device and the second portable electronic device is configured to receive a geographic position of the other portable electronic device and, using only the first geographic position and the second geographic position, identify a harvesting operation performed by the agricultural harvester; determine a harvesting distance, a harvesting duration of time, or both of the harvesting operation; and estimate a current fill level of the crop transport vehicle based on the harvesting distance, the harvesting duration of time, or both.

20 Claims, 6 Drawing Sheets

(58) Field of Classification Search
USPC .......................................................... 701/50
See application file for complete search history.

(56) References Cited

U.S. PATENT DOCUMENTS

| | | | |
|---|---|---|---|
| 2007/0135190 A1* | 6/2007 | Diekhans | G05D 1/0278 460/1 |
| 2009/0071143 A1* | 3/2009 | Foster | F16H 61/47 60/327 |
| 2009/0123261 A1* | 5/2009 | Richman | A01D 46/085 56/28 |
| 2011/0213531 A1* | 9/2011 | Farley | A01D 41/1275 701/50 |
| 2012/0259537 A1* | 10/2012 | Schmidt | G05D 1/0289 701/300 |
| 2014/0278083 A1* | 9/2014 | Foster | G01S 19/14 701/522 |
| 2018/0338422 A1* | 11/2018 | Brubaker | A01D 41/1208 |

FOREIGN PATENT DOCUMENTS

| | | |
|---|---|---|
| WO | 2000/35265 A1 | 6/2000 |
| WO | 2011/104085 A1 | 9/2011 |

* cited by examiner

HARVEST LOGISTICS

CROSS REFERENCE TO RELATED APPLICATION

This application claims the benefit of U.S. Provisional Application No. 62/721,011 filed Aug. 22, 2018, which is hereby incorporated by reference in its entirety.

TECHNICAL FIELD

The present disclosure is generally related to farming operations, and, more particularly, computer-assisted logistics in farming.

BACKGROUND

When harvesting crops such as silage, wheat, corn or soybeans, groups of harvesting and transport vehicles are often used. In practice there is little coordination or planning between the harvesting and transport vehicles, resulting in empty trips and/or unnecessary wait times. It would be helpful for transport vehicle operators and/or farm management personnel to have more information to facilitate efficient farming logistics.

SUMMARY OF THE INVENTION

In one embodiment, a system comprises a first portable electronic device carried on an agricultural harvester, the first portable electronic device including a positioning component for determining a first geographic position of the first portable electronic device, and a second portable electronic device carried on a crop transport vehicle, the second portable electronic device including a positioning component for determining a second geographic position of the second portable electronic device. At least one of the first portable electronic device and the second portable electronic device is configured to receive the geographic position of the other portable electronic device, using only the first geographic position and the second geographic position, identify a harvesting operation performed by the agricultural harvester, determine a harvesting distance, a harvesting duration of time, or both of the harvesting operation, and estimate a current fill level of the crop transport vehicle based on the harvesting distance, the harvesting duration of time, or both.

These and other aspects of the invention will be apparent from and elucidated with reference to the embodiment(s) described hereinafter.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Figure 1:
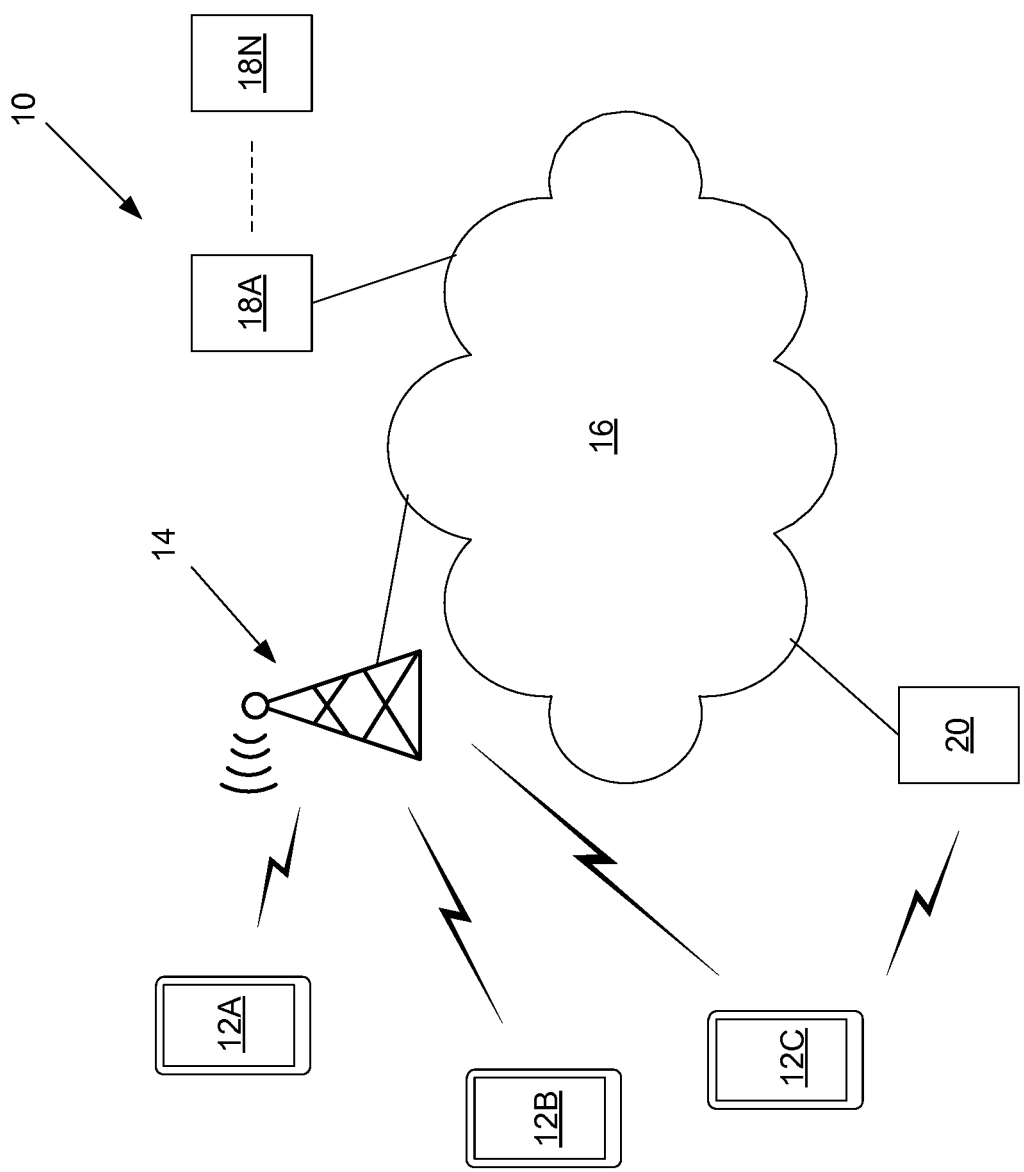
FIG. 1 is a schematic diagram that illustrates an example network environment in which an embodiment of a harvest logistics system may be implemented.

Certain embodiments of a harvest logistics system and method are disclosed that are used to increase the efficiency of harvesting operations. In one embodiment, a harvest logistics system includes a fleet of vehicles and network devices, including plural harvesting vehicles (e.g., forage harvesters), one or more servers (e.g., of a cloud platform), plural transport vehicles that support overloading operations for the harvesting vehicles, and one or more apparatuses, most of which are associated with (e.g., in possession or control of an operator residing within) the respective transport vehicles and/or the harvesting vehicles. In one embodiment, one or more of the apparatuses each comprises a (hand-held) mobile communications device (e.g., smartphone) that comprises hardware and software configured to determine current (and projected) fill levels for material collected (or to be collected) by each transport vehicle from the harvesting machines during overloading operations, and communicate, over a communications network, those levels and other information (e.g., location information) to the one or more servers. The current fill levels, and in some embodiments, the predicted locations at capacity (e.g., 100% fill levels), are provided over the communications network from the one or more servers, to all of the transport vehicles working in support of harvesting operations for a field. This information is rendered as a visualization (e.g., displayed presentation) to each operator and/or other personnel. In some embodiments, one of the apparatuses may be associated with a dispatcher or farm manager/owner (e.g., located external and/or remote from the field) or one of the operators (in one of the transport vehicles or one of the harvesting vehicles) overseeing the harvesting and transport operations, in which case the fill levels and locations at capacity, and other information, are provided additionally to that individual whom in turn directs the dispatch of transport vehicles to replace a soon-to-be full transport vehicle in need of replacement.

Digressing briefly, and as noted in the background, current harvesting operations lack proper planning and/or coordination among the harvesting vehicles and transport vehicles. For example during harvesting of material for silage, empty transport vehicles may follow a transport vehicle being filled for hundreds of meters because there is no information about the fill level and therefore the handover location is unknown. In contrast, certain embodiments of a harvest logistics system enable the sharing of Information about the current fill levels and predicted locations at projected capacity (e.g., maximum fill level or 100% fill) among operators in the field (and to personnel outside the field), which may enable intelligent decisions on planning of resources, which in turn may save resources and provide for efficient harvesting operations. Information about the fill levels and predicted locations where (and times when)

machines will reach capacity may be generated entirely by two or more portable electronic devices (e.g., smartphones or tablets) carried on the machines (e.g., harvesters and transport vehicles) but not electronically or communicatively coupled with the machines. In other words, the portable electronic devices may be carried on, but operate independently of, the machines. The portable electronic devices may determine fill levels and predict when and where machines will reach capacity using the locations of multiple portable devices, as explained below in greater detail.

Having summarized certain features of a harvest logistics system of the present disclosure, reference will now be made in detail to the description of the disclosure as illustrated in the drawings. While the disclosure will be described in connection with these drawings, there is no intent to limit it to the embodiment or embodiments disclosed herein. For instance, in the description that follows, one focus is on a harvesting vehicle embodied as a forage harvester that processes silage, among other material, without an on-board storage bin. However, some embodiments of a harvest logistics system may be used for other harvesting vehicles (e.g., a combine harvester) or for logistics associated with the collection and transport of other material for other industries (e.g., the harvesting/collection and transport of material such as minerals in mining, harvesting/collection of material such as soil in construction, etc.). Further, though emphasis is on the use of a handheld, mobile communications devices (e.g., smartphones) as an example apparatus, in some embodiments, mobile devices such as laptops, tablets, etc., or fixed devices including gateway/telephony equipment integrated in a cab of the transport vehicle or harvesting vehicle may be used in some embodiments of a harvest logistics system. Also, though certain embodiments of a harvest logistics system are disclosed as using transmission and receipt of information via a centralized communications network involving one or more servers and the apparatuses for the coordination among transport vehicles, in some embodiments, coordination may be achieved using a peer-to-peer approach (e.g., between apparatuses without intervention by the one or more servers) over a wireless (e.g., Wireless Fidelity, 802.11, Bluetooth, etc.) network. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the scope of the disclosure as defined by the appended claims. Further, it should be appreciated in the context of the present disclosure that the claims are not necessarily limited to the particular embodiments set out in the description.

Referring now to FIG. 1, shown is an example network environment 10 in which an embodiment of a harvest logistics system may be implemented. It should be appreciated by one having ordinary skill in the art in the context of the present disclosure that the environment 10 is one example among many, and that some embodiments of a harvest logistics system may be used in environments with fewer, greater, and/or different components than those depicted in FIG. 1. The environment 10 comprises a plurality of devices that enable communication of information throughout one or more networks. The depicted environment 10 comprises plural apparatuses 12 (e.g., 12A-12C), a wireless/cellular network 14, a wide area network 16, and one or more servers 18 (e.g., 18A-18N). The apparatuses 12 comprise telephony functionality (e.g., cellular modem), wireless (e.g., wireless fidelity) functionality (e.g., wireless modem), or a combination of telephony and wireless functionality. In some embodiments, the apparatuses 12 comprise positioning/location functionality, including global navigation satellite systems (GNSS) functionality. In one embodiment, the apparatuses 12 comprise mobile communications devices, including a handheld smartphone as depicted for illustration in FIG. 1. In some embodiments, one or more of the apparatuses 12 may be embodied as other types of mobile communications devices, including a laptop, tablet, notepad, etc. In some embodiments, one or more of the apparatuses 12 may be embodied as a fixed device, including a device integrated into a console (e.g., within a cab) of a transport vehicle or a harvesting vehicle. In some embodiments, apparatus 12 may be connected to use the display of a transport vehicle or a harvesting vehicle for visual or audio representation (such as MirrorLink or Android Auto or Apple CarPlay). Each of the apparatuses 12 may be, at least temporarily, associated with a respective vehicle (e.g., the transport vehicle, the transport vehicle, etc.). For instance, each operator of a respective transport vehicle may possess or control the apparatus 12, and the apparatus 12 may be mounted on a console within a cab of the transport vehicle. As another example, each operator of a harvesting vehicle (or other vehicle, including a compaction vehicle) may possess the apparatus 12. In some embodiments, one or more of the apparatuses 12 may not be associated with any particular work vehicle. For instance, a dispatcher or farm manager may be located external to a field (e.g., at an office at a storage site or silo for depositing the material) in which the harvesting and transport vehicles operate to harvest material, the dispatcher or farm manager/owner in possession of one of the apparatuses 12.

The apparatuses 12 communicate over a communications network with the one or more servers 18. In one embodiment, the communications network comprises the wireless/cellular network 14, or a combination of the wireless/cellular network 14 and the wide area network 16. The wireless/cellular network 14 may include the necessary infrastructure to enable wireless and/or cellular communications between the apparatuses 12 and the one or more servers 18. There are a number of different digital cellular technologies suitable for use in the wireless/cellular network 14, including: 3G, 4G, 5G, GSM, GPRS, CDMAOne, CDMA2000, Evolution-Data Optimized (EV-DO), EDGE, Universal Mobile Telecommunications System (UMTS), Digital Enhanced Cordless Telecommunications (DECT), Digital AMPS (IS-136/TDMA), and Integrated Digital Enhanced Network (iDEN), among others, as well as Wireless-Fidelity (Wi-Fi), 802.11, streaming, etc., for some example wireless technologies.

The wireless/cellular network 14 may comprise suitable equipment that includes a modem, router, switching, etc. For instance, though the apparatuses 12 are primarily shown as communicating with the servers 18 via cellular technology, in some embodiments, the apparatuses 12 may communicate with the servers 18 via a router and cable modem 20 coupled to the wide area network 16.

The wireless/cellular network 14 is coupled to the wide area network 16 in known manner. The wide area network 16 may comprise one or a plurality of networks that in whole or in part comprise the Internet.

The apparatuses 12 may communicate with the one or more servers 18 using a plurality of networks (e.g., wireless/cellular network 14, wide area network 16), including PSTN (Public Switched Telephone Networks), POTS, Integrated Services Digital Network (ISDN), Ethernet, Fiber, DSL/ADSL, Wi-Fi, among others, using TCP/IP, UDP, HTTP, DSL, among others.

The servers 18 (e.g., 18A, . . . 18N) are coupled to the wide area network 16, and in one embodiment may comprise one or more computing devices networked together, including an application server(s) and data storage. In one embodiment, the servers 18 may serve as a cloud computing environment (or other server network) configured to receive information from each of the apparatuses 12 and provide feedback to each of the apparatuses 12. For instance, the servers 18 may receive or determine current and projected fill levels for the transport vehicles and corresponding position (e.g., GNSS) information and other movement information (e.g., location, velocity, etc.) for the transport vehicles associated with farming operations for one or more fields. The servers 18 may then provide the fill levels, movement information, position information, status, field information, road information, etc. to all of the apparatuses 12. The information provided by the servers 18 may be used by software (e.g., an app) at each apparatus 12 to render a visualization of the transport vehicles, harvesting vehicles, fill levels, among other information helpful to harvest logistics at each apparatus 12. In some embodiments, the servers 18, acting in part as a web server, may provide a visualization of the same information on a web-site, wherein each of the apparatuses 12 access this information using software (e.g., browser software) residing in each apparatus 12. In some embodiments, fill levels are determined at each apparatus 12, and in some embodiments, fill levels are determined at the servers 18 (e.g., based on data communicated to the servers 18 from the apparatuses 12). In some embodiments, functionality for determinations needed for certain embodiments of a harvest logistic system may be distributed among the apparatuses 12 and the server 18.

When embodied as a cloud service or services, the servers 18 may comprise an internal cloud, an external cloud, a private cloud, a public cloud (e.g., commercial cloud), or a hybrid cloud, which includes both on-premises and public cloud resources. For instance, a private cloud may be implemented using a variety of cloud systems including, for example, *Eucalyptus* Systems, VMWare vSphere®, or Microsoft® HyperV. A public cloud may include, for example, Amazon EC2®, Amazon Web Services®, Terremark®, Savvis®, or GoGrid®. Cloud-computing resources provided by these clouds may include, for example, storage resources (e.g., Storage Area Network (SAN), Network File System (NFS), and Amazon S3®), network resources (e.g., firewall, load-balancer, and proxy server), internal private resources, external private resources, secure public resources, infrastructure-as-a-services (IaaSs), platform-as-a-services (PaaSs), or software-as-a-services (SaaSs). The cloud architecture of the servers 18 may be embodied according to one of a plurality of different configurations. For instance, if configured according to MICROSOFT AZURE™, roles are provided, which are discrete scalable components built with managed code. Worker roles are for generalized development, and may perform background processing for a web role. Web roles provide a web server and listen for and respond to web requests via an HTTP (hypertext transfer protocol) or HTTPS (HTTP secure) endpoint. VM roles are instantiated according to tenant defined configurations (e.g., resources, guest operating system). Operating system and VM updates are managed by the cloud. A web role and a worker role run in a VM role, which is a virtual machine under the control of the tenant. Storage and SQL services are available to be used by the roles. As with other clouds, the hardware and software environment or platform, including scaling, load balancing, etc., are handled by the cloud.

In some embodiments, the servers 18 may be configured into multiple, logically-grouped servers (run on server devices), referred to as a server farm. The servers 18 may be geographically dispersed, administered as a single entity, or distributed among a plurality of server farms. The servers 18 within each farm may be heterogeneous. One or more of the servers 18 may operate according to one type of operating system platform (e.g., WINDOWS NT, manufactured by Microsoft Corp. of Redmond, Wash.), while one or more of the other servers 18 may operate according to another type of operating system platform (e.g., Unix or Linux). The group of servers 18 may be logically grouped as a farm that may be interconnected using a wide-area network connection or medium-area network (MAN) connection. The servers 18 may each be referred to as, and operate according to, a file server device, application server device, web server device, proxy server device, or gateway server device.

In one embodiment, as indicated above, one or more of the servers 18 may comprise a web server that provides a web site that can be accessed by the apparatuses 12 via browser software. For instance, the web site may provide visualizations that include a field map showing relative locations of the transport vehicles (and the harvesting machines in some embodiments, storage locations), via known farm management information systems, on and around the field(s). In other words, field maps and representations of vehicles on or around the represented fields may be provided using known location service/mapping techniques, including the use of farm management information systems. For instance, harvesting vehicles and/or transport vehicles may include communication functionality and location devices (e.g., GNSS functionality) that are used to communicate continually updated locations in a field or on roadways to a server, not unlike existing systems today that render a passenger vehicle along a continually updated map of a road or highway. In addition, certain embodiments of a harvest logistics system may provide for additional visualizations, overlaid on such a field map, not present in conventional systems, including fill levels, predicted locations of the transport vehicles at projected 100% fill levels, and/or ordering of replacement transport vehicles, among other information as flagged by operators or personnel in possession of an apparatus 12.

The functions of the servers 18 described above are for illustrative purpose only. The present disclosure is not intended to be limiting. For instance, functionality for performing one or more tasks of the harvest logistics system may be implemented by the apparatuses 12, one or more servers 18, or a combination thereof. For instance, though described above primarily as a master-slave configuration for certain processing (e.g., the servers 18 receiving information from the apparatuses 12 and providing feedback to the apparatuses 12 based on the information from the apparatuses 12), in some embodiments, a peer-to-peer configuration may be used where the apparatuses 12 communicate directly with each other, either through direct radio communications (e.g., Wi-Fi or Bluetooth) or through a communications system such as the and the wireless/cellular network 14. In scenarios where the apparatuses 12 communicate directly with each other, the functionality of the one or more servers 18 is achieved at the apparatuses 12 (and the servers 18 are omitted).

Note that cooperation between the apparatuses 12 and the one or more servers 18 may be facilitated (or enabled)

through the use of one or more application programming interfaces (APIs) that may define one or more parameters that are passed between a calling application and other software code such as an operating system, a library routine, and/or a function that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer employs to access functions supporting the API. In some implementations, an API call may report to an application the capabilities of a device running the application, including input capability, output capability, processing capability, power capability, and communications capability.

An embodiment of a harvest logistics system may include various combinations of the components described above for the environment 10. For instance, in one embodiment, the harvest logistics system may include two of the apparatuses 12 and a single server 18, and in some embodiments, the harvest logistics system may comprise the servers 18 and the apparatuses 12. For purposes of illustration and convenience, implementation of an embodiment of a harvest logistics system is described in the following as being implemented with fill level and predicted location determinations performed at each of the apparatuses 12 and the collection of the fill levels and other information received from the apparatuses 12 is provided back to the apparatuses 12 from one of the servers 18, with the understanding that functionality may be implemented in other and/or additional devices.

Figure 2:
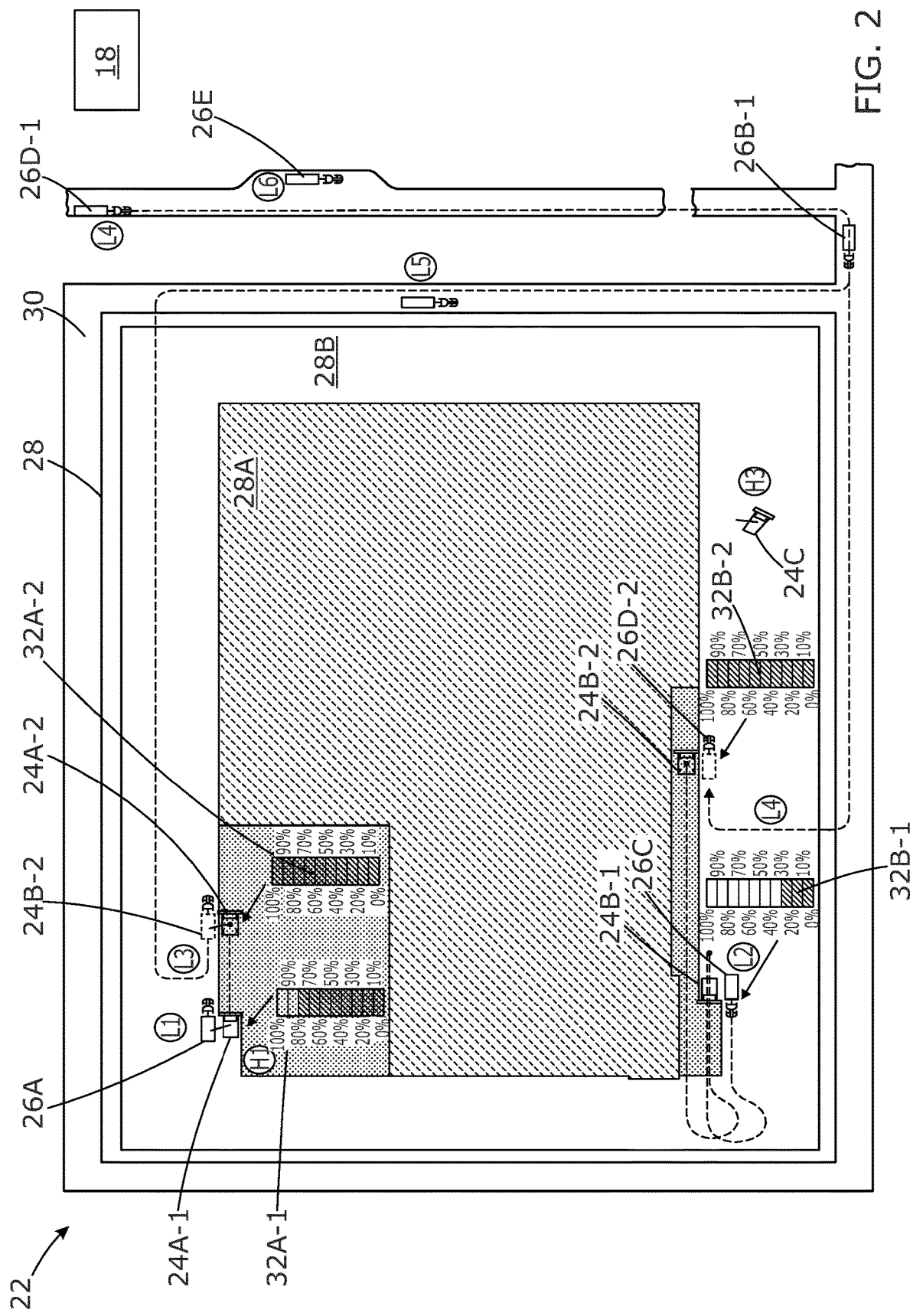
FIG. 2 is a schematic diagram that conceptually illustrates an embodiment of an example harvest logistics system.

Having described an example network environment 10 in which certain embodiments of an example harvest logistics system may be implemented, attention is directed to FIG. 2, which conceptually illustrates an embodiment of an example harvest logistics system 22. It should be appreciated by one having ordinary skill in the art that the harvest logistics system 22 depicted in FIG. 2 merely conceptually illustrates one example harvest logistics system 22, and that some embodiments may have fewer or additional vehicles and/or different visualization mechanisms. The harvest logistics system 22 includes a plurality of harvesting vehicles 24 (e.g., 24A-24C) and transport vehicles 26 (e.g., 26A-26D) navigating (under operator control, though in some embodiments, operated semi-autonomously) a field (or fields) 28 and roadways or paths 30 as a fleet or group (though other fleets or groups may be encountered at the storage site and/or roadways 30). In one embodiment, the harvesting vehicles 24 comprise forage harvesters, and the transport vehicles 26 comprise grain carts pulled by a tractor, though other types of harvesting vehicles 24 (e.g., combine harvesters) and/or transport vehicles 26 (e.g., semi-trailers) may be used in some embodiments. The field 28 is depicted as harvested 28A and non-harvested 28B (or equivalently, unharvested). The roadways 30 enable the transport vehicles 26 to move between a storage site (e.g., for unloading at a grain silo and the field 28. The dashed lines indicate pathways or routes traveled or to be traveled by the harvesting vehicles 24 and transport vehicles 26. The harvesting vehicles 24 and transport vehicles 26 represented in phantom depict anticipated or predicted locations, referenced from the preceding (preceding along the dashed line) harvesting vehicle 24 and transport vehicle 26, where fill levels are expected to be at capacity (e.g., full or 100% capacity) and hence in need of a replacement transport vehicle 26 to carry on operations without (or with minimal) harvesting interruptions, as explained further below. Note that reference to capacity refers to a physical maximum or 100% capacity level.

The harvest logistic system 22 further comprises a plurality of apparatuses 12 (FIG. 1), not shown in FIG. 2, but for which corresponding visualizations 32 represent their presence in FIG. 2. That is, in one embodiment, the apparatuses 12 provide for a rendering of visualizations 32 on respective user interfaces of the apparatuses 12. The visualizations 32 include, among other information, fill levels of the transport vehicles 26. The fill levels of the visualizations 32 are depicted as a column bar with gradations every 10% (e.g., from empty or 0% full, to capacity or 100% full). It should be appreciated by one having ordinary skill in the art that other visual mechanisms for representing fill levels, using the same or different gradations (e.g., gradations of every 20%), may be used in some embodiments. Alternatively, the fill levels may be communicated to the operator by audio signal or natural speech. The apparatuses 12 may be in the possession of, or under the control of, operators located in cabs of the transport vehicles 26, though in some implementations, the apparatuses 12 may be in the possession of, or under the control of, operators in the harvesting vehicles 24, or in both the harvesting vehicles 24 and the transport vehicles 26. GNSS functionality in the harvesting vehicles 24 and transport vehicles 26 and in the apparatus 12 may indicate when there is proximity among the vehicles 24, 26 (suggestive cooperation between the vehicles in a harvesting mode of operation during which time the transport vehicle 26 is being loaded with crop) and the apparatus 12, and also when their respective paths are co-aligned (e.g., and hence residing in one of the vehicles 24, 26) and parallel (in a loading process) and when paths cross (e.g., at a headlands). In some embodiments, one or more of the apparatuses 12 may be located external to the harvesting vehicles 24 and/or transport vehicles 26, including at a farm management office, farm, the silo, among other locations. For instance, a dispatcher (for the transport vehicles 26) or farm owner or manager may possess an apparatus 12 and, based on the information provided in a harvest logistics system, provide coordination among the operators of the transport vehicles 26 during harvesting operations from an office environment. In some embodiments, coordination among transport vehicles 26 and harvesting vehicles 24 may be performed autonomously or semi-autonomously based on information collected by the apparatuses 12 and servers 18.

It is noted that the visualizations 32 rendered on the user interfaces of each of the apparatuses 12 (FIG. 1) may include all or most of the features depicted in FIG. 2. For instance, visualizations 32 may include a rendered field map and nearby roads (e.g., using known mapping services of a farm management information system, as explained above), icons for the harvesting vehicles 24 and the transport vehicles 26 and their respective locations and movement in or around a field 28 or on roadways 30. Visualizations 32 may also include those made possible by certain embodiments of a harvest logistics system, including current fill levels and predicted locations when fill levels are projected to be at capacity. The visualizations 32 that indicate the fill levels are associated with the apparatuses 12, which possess location functionality (e.g., GNSS functionality) and hence may be rendered at these locations in a field map that are coincident with the transport vehicles 26 that likewise possess location functionality (GNSS functionality). Note that the limits of the rendered field may be input using ISO XML, a drawing of a dispatcher, a .shp file, among other techniques. In some embodiments, the visualizations 32 may include additional features, including one or any combination of an indication of unharvested areas in a field 28 corresponding to the field map, an indication (e.g., visual difference, including difference in color, texture, or labeling, including percentage of total area to be harvested) of harvested areas in the field 28, an indication of access points for the field (which may vary depending on which portions of the field 28 have and have not been harvested), an indication of points of interest of, and proximal to, the field 28 (e.g., as tagged by an operator or dispatcher or farm owner or manager), an indication of points of danger (e.g., as tagged by an operator or dispatcher or farm owner or manager) in or around the field 28, an indication (icon) of, and location of, a storage site, distances (e.g., labeled distances or scales) to and from one or more locations (e.g., to silo, compaction vehicle, distance from storage site to field and vice versa) relative to the field 28 or the predicted destination, an indication of oncoming traffic (e.g., via oncoming traffic alerts, including flashing lights, warning icons, audible beeps of changing strength or frequency based on nearness of the approach), including whether the operator is a team member or associated with a different team or harvesting group using the same app, a status indication (e.g., fill level, whether free or occupied, whether shared with other harvest groups and their identity, etc.) of a storage site and/or compaction vehicle, or waiting time for an unloading process for each of the plural transport vehicles (e.g., waiting times of the transport vehicles 26 at the silo, which may be provided to a dispatcher), waiting times of harvesting vehicles 24 where it is without a transport vehicle 26 (e.g., which may be provided to a dispatcher). In some embodiments, an order of harvesting may be visually represented (e.g., using field identifiers, indices for each field or sub-field within a field, etc.). In some embodiments, the visualizations 32 may include pop-up messages or alerts that advise each operator when certain portions of a field or the entire field has been harvested, or as indicated above, alerts regarding, for instance, on-coming traffic or field or road hazards. In some embodiments, the visualization 32 may include an identity of the harvesting group and associated equipment (e.g., manufacturer, identifier, etc.). The aforementioned indications may be in the form of icons or symbols representative or suggestive of the feature or condition being indicated, or represented via text. The visualizations 32 may be updated at a rate that may be operator configured or pre-programmed (e.g., every 2 seconds).

Functionality of the apparatuses 12 determine a current fill level and a predicted location at a projected 100% fill level based on a mass or material flow rate (of the crop material harvested by the harvesting vehicle 24 and transferred to the transport vehicle 26). In one embodiment, certain embodiments of a harvest logistics system 22 do not use data communicated from any of the vehicles 24, 26 to determine crop transfer. In one embodiment, functionality (e.g., an app) on each of the apparatuses 12 uses position data (e.g., using GNSS functionality on the apparatus 12) and determines how long (e.g., in terms of time (duration) or distance) the harvesting vehicle 24 and the transport vehicle 26 drive parallel to each other during loading operations (e.g., transferring harvested material to the transport vehicle 26) and calculates the amount of transferred crop material. The paths of the harvesting vehicle 24 and the transport vehicle 26 can thereby differ within predetermined limits (e.g., 5° in angle) to enable small steering corrections by the operator. Furthermore, in addition to the parallelism, the transport vehicle 26 must drive within a certain distance of the harvesting vehicle 24 to avoid the situation where a loading operation is incorrectly identified while the transport vehicle 26 drives parallel to, but far away from, the harvesting vehicle 24. This situation may also occur if the harvesting vehicle 24 and a (first) transport vehicle 26 are already in loading operation while the next transport vehicle 26 is already lined up on a parallel path to replace (first) transport vehicle 26 for loading. Furthermore, in addition to parallelism, the harvest logistics system 22 may also monitor vehicle speed and/or travelling direction to indicate a loading operation. During loading, harvesting vehicle 24 and the transport vehicle 26 must drive in the same direction and at approximately the same vehicle speeds. Again, small deviations may be acceptable to enable corrections by the operator.

For instance, and assuming the apparatus 12 is under the control or possession of an operator of the transport vehicle 26, the app of the apparatus 12 receives GNSS information of the harvesting vehicle 24 (e.g., via a farm management information system) and determines when the harvesting vehicle 24 and the apparatus 12 are in proximity to each other and also following parallel paths, which is suggestive of the beginning of a loading mode. The GNSS information includes timing information, which can be recorded at the start of the overloading mode. In some embodiments, timer functionality associated with a software or hardware clock of the apparatus 12 may be activated by the app at the start of the overloading mode. The app of the apparatus 12 records the distance or time loading occurs, or equivalently, when harvesting operations are in progress. In instances where harvesting is paused (e.g., a non-harvesting condition), the app does not include (omits) this duration of time or distance traveled at the headlands. In one embodiment, the non-harvesting condition is detected by the app 12 based on the initial divergence of the parallel paths and/or a crossing of the paths of the harvesting vehicle 24 and the transport vehicle 26 within which the apparatus 12 resides. The aforementioned path changes may be detected from inertial mechanisms or GNSS functionality of the apparatus 12 and the harvesting vehicle 24. In some embodiments, a virtual area for the harvesting vehicle 24 may be defined which represents the loading area and which moves with the vehicle. This virtual area may consider the geometry of the loading auger and may be of any shape such as rectangular, circular etcetera and may be defined symmetrically to the vehicle axis or on either one side or the other, e.g., when the loading auger position or the representation of the worked area relative to unworked area indicates a preferred side for loading. If the transport vehicle 26 enters this virtual area (e.g., as determined by respective position data), the app of the apparatus 12 may receive an indication that harvesting operations are in progress and when the transport vehicle 26 leaves this area, the app may receive an indication of headlands. Alternatively a virtual area for the transport vehicle 26 may be defined which represents the filing area and which moves with the vehicle. This virtual area may consider the geometry of the transport container receiving the harvested crop and may be of any shape such as rectangular, circular etc. Alternatively, virtual areas for both vehicles, harvesting vehicle 24 and transport vehicle 26, may be defined according to the aforementioned provisions and the app of the apparatus 12 may receive an indication that harvesting operations are in progress when the virtual area of harvesting vehicle 24 and the virtual area of the transport vehicle 26 partly or fully overlap and may receive an indication of headlands when the virtual areas do not overlap. More alternatively, the indication of headland or harvesting operations may be received by permanently determining the distance between the geographic position of harvesting vehicle 24 and the transport vehicle 26, whereby the app of the apparatus 12 may receive an indication that harvesting operations are in progress if the distance is below a predetermined distance value while headland may be indicated by the distance exceeding said predetermined distance value. In some embodiments, the app may receive an indication of headlands based on the reduced harvesting noise (e.g., as detected by a microphone of the apparatus), or based on detecting an HMI tone assigned to the headlands mode. The app re-starts the recording of time and/or duration until the loading mode terminates. In one embodiment, the app may detect the end of the loading mode by detecting that the harvesting vehicle 24 and the transport vehicle 26 withdraw from each other (e.g., a threshold distance), signifying that the transport vehicle 26 is at capacity and needs to navigate to a storage site or silo for unloading. If, for example, the compaction vehicle working on the storage silo is included in the network environment 10 with an apparatus 12 under control of an operator, information on the silo capacity or grain silo capacity may be forwarded by the compaction vehicle to the transport vehicle 26 to guide it to the silo intended to be served next. An operator on the compaction vehicle 12 can be manually mark a silo as full (and apparatus 12 determines the geographic position of this silo) or to be served next (in this case the operator can mark on a map to determine geographical position). This is especially advantageous if the silos are locally spread over a larger area. In one embodiment, the recorded distance before and after the headlands (or recorded time before and after the headlands), less non-harvesting time or distance, results in one parameter for the mass flow determination. That is, in general, the total recorded distance or time from the detection of proximity of the harvesting vehicle 24 and the transport vehicle 26 and the detection of a heading of both along a parallel path (signifying the beginning of an overloading mode) until the detected end of the overloading mode as described above, wherein the time or distance pertaining to headlands or non-harvesting operations is omitted, provides one parameter for determination of the mass flow rate. Another parameter may be entered by an operator or retrieved from memory of the apparatus 12, and may include the known capacity of the transport vehicle 26, a working width of the harvesting vehicle 24 (e.g., the bushel output as a function of time or distance), map data (e.g., an estimate of the bushels of material from the harvested area as indicated in the map data), or other parameters that are indicative of the transferred mass of crop material. From the mass flow rate, the fill levels of the transport vehicle 26 may subsequently be determined and updated.

In some embodiments, the mass flow rate may be determined based on operator observation and control of timer functionality of the apparatus 12. For instance, an operator may activate the app on the apparatus 12, which begins a timer corresponding to the start of the loading mode between the harvesting vehicle 24 to the transport vehicle 26. When the transport vehicle 26 reaches capacity (e.g., as observed by the operator of the transport vehicle 26), the operator stops the timer, and the app computes the time it takes, based on an average velocity (e.g., as determined from the GNSS information) to reach 100% capacity. Headlands or other non-harvesting periods may be omitted by the user simply pausing the timer. An actual capacity of the transport vehicle 26 may be entered by the user, including via entry in a data field, or selected using a drop down menu that lists a plurality of types of transport vehicle 26 to choose from, or accessed from storage of the apparatus 12. Using the recorded time to reach capacity and/or knowing the actual capacity of the transport vehicle 26, the app computes the mass flow rate. When the time/distance to reach the capacity and/or the capacity of the transport vehicle is not known at the beginning of the harvesting operation, a calibration procedure may be initiated when the harvesting vehicle 24 and the transport vehicle 26 are in loading mode for the first time (e.g. in a harvesting season). The calibration procedure must be initiated by the operator. In one embodiment, upon calibration activation, the apparatus 12 may automatically detect a loading operation (e.g. by parallel driving or any other indication mentioned above) and start to record time/distance until the path of the two vehicles indicates that loading is aborted (e.g., when the operator leaves the parallel path). Apparatus 12 can thereby determine the time/distance to reach capacity. In one embodiment, the operator manually starts a timer/distance measurement when activating calibration procedure and manually stops the timer/distance measurement by pressing a button etc. The time/distance to reach capacity is thereby determined initially and may be communicated to other apparatus 12A, 12B, 12C being used on vehicles with the same capacity. The operator on each of the vehicles may then confirm to take the value or initiate a calibration process with the vehicle under his control. In the same manner, the values may be saved for use in the next harvesting season for this field and/or this type of crop. As harvesting condition may change during operation, the harvest logistics system may permanently update time/distance to reach capacity during harvesting operation. If harvesting operation is provided in an area of the filed with lower crop yield (e.g. as this area was not properly irrigated), an operator may manually extend unloading operation and extended the time/distance to reach capacity is updated and communicated to apparatus 12A, 12B, 12C. Thereby harvest logistics system is permanently optimizing operation.

For instance, and using a simple example for illustrative purposes, over the duration of five (5) minutes as recorded by the app between the start and end points of the operator-prompted timer in the apparatus 12, a 100% fill level is observed by the operator, which means that the transport vehicle capacity of 1000 bushels (as entered by the operator) has been achieved. The app computes the mass flow rate as 1000 bushels over a five minute duration, or, 200 bushels per minute.

Whether timer/observation-based or parallel path based, the app may use pre-defined gradations, or in some embodiments, user-configured gradations, for the visualization 32 (as is true for the embodiment that is based on detection of parallel paths) of the fill levels. In the simple example where the determined mass flow rate (from either method) is 200 bushels per minute, and using the element of time for illustration, the app may have pre-programmed gradations (e.g., of 20%) for the visualization 32 of the fill level, and hence after one minute of loading mode travel (wherein the moving harvesting vehicle 24 transfers the harvested crop material to the transport vehicle 26), the transport vehicle fill level is $\frac{1}{5}^{th}$ full or at 20%. After two minutes of travel, the fill level is at 40% capacity. After three minutes of travel, the fill level is at 60% capacity, and so on. The app further predicts a location of a projected capacity (100%) for the transport vehicle 26 (e.g., based on the GNSS information including the current location, the heading, and the mass flow rate). That is, the app determines where and when (e.g., in absolute time and/or relative time, which is relative to the time associated with the current fill level) the transport vehicle 26 will be at a 100% fill level. The app communicates this information (e.g., fill levels, predicted field location, distance, time, etc.) to the server 18, as do other apparatuses 12 that perform these determinations for their associated transport vehicle 26. In some embodiments, apparatuses 12 associated with harvesting vehicles 24 may record this information or other information (e.g., status, such as down time, reason for the down time, field location, etc.) and provide this information to the server 18. The server 18, in turn, combines this information in the aggregate and provides this aggregate data (e.g., fill levels, predicted location and/or time at 100% full, status, etc.), collected from all of the apparatuses 12 associated with all of the transport vehicles 26 (and in some embodiments, for the harvesting vehicles 24 and other vehicles or locations) in and around the field 28, to all of the apparatuses 12 of the system 22, enabling an entire fleet-view for all operators. In one embodiment, the information is only provided to certain apparatuses 12. For example, only the apparatus 12 on the transport vehicle 26 being closest to the harvesting vehicle 24 and/or being assigned to be loaded next may receive the information. The selection which apparatus 12 receives the information may also depend on the purpose of the vehicle on which apparatus 12 is carried, on geographical position or on the status of the vehicle in terms of capacity (e.g a transport vehicle 26 may not receive information about filling levels when returning to a silo). In other words, certain embodiments of a harvest logistics system 22 enable intelligent and efficient decisions on when transport vehicles 26 need replacement transport vehicles 26 and at what location in the field 28.

Though an example fill level and fill level projection has been described above based on time, a similar description ensues for distance-based fill level computations. For instance, assume a mass flow rate has been computed based on a capacity of 1000 bushels over a 1000 meter distance. The gradations in the visualization 32 translate to 200 bushels at 20%, 400 bushels at 40%, and so on. More importantly, from the mass flow rate, the app is able to predict the estimated distance when each of the transport vehicles 26 needs a replacement (as well as time information based further on GNSS information), which in this simple example, 20% of capacity is at 200 meters, 40% of capacity is at 400 meters, and in 1000 meters, the transport vehicle 26 will be at 100% capacity. The apparatus 12 may provide time and distance information, including current and projected coordinates, to the server 18, which in turn informs and updates all apparatuses 12 in the field 28 and on the road 30, providing information that is helpful to making a determination of which replacement transport vehicle 26 to direct to the predicted location and by what time.

Though the description above focuses on a mass flow determination based on detection of parallel and diverging paths, or based on operator observation and timer functions, in some embodiments, the mass flow rate may be determined by simply entering (or accessing from apparatus memory) the mass flow rate via a graphical user interface of the app (e.g., entering in a data field or from a drop down menu based on the type or model of the harvesting vehicle 24 involved or the type of crop, crop growth level, etc. which is harvested). In some embodiments, the mass flow rate comprises an average crop flow per time/distance.

Referring again to FIG. 2, the example operation depicted for the harvest logistics system 22 is described further below. In general, there are plural transport vehicles 26 that are working in cooperation with (or supporting yet not yet cooperating) harvesting vehicles 24 in the field 28 according to an overloading mode, including harvesting vehicle 24A-1 (designated also as H1) and transport vehicle 26A (upper left in FIG. 2, with the location designated as L1) and harvesting vehicle 24B-1 (designated also as H2) and transport vehicle 26C (lower left in FIG. 2, with the location designated as L2). As noted by visualization 32A-1, the transport vehicle 26A is at an 80% fill level (the visualization 32A-1 and the other visualizations in FIG. 2 shown in gradations of 10% as a non-limiting example). Based on the app determining the mass flow rate, the app associated with the transport vehicle 26A at L1 determines the predicted location in the field 28 where the transport vehicle 26A is projected to be at a 100% fill level as reflected by the predicted visualization 32A-2, the predicted location represented by L3. The app associated with the apparatus 12 (which is associated with the transport vehicle 26A in this example) communicates this current and predicted fill level and GNSS information to the server 18, which in turn provides this information and similar information determined by apps of other apparatuses 12 of the harvest logistics system 22 (among other information) to all of the apparatuses 12 associated with a given fleet or group in the harvest logistics system 22. Based on this information about the impending 100% fill level predicted for L3, the empty transport vehicle 26B-1 is directed along the roadway 30 to L3 to replace transport vehicle 26A at that location L3, where the harvesting vehicle 24A-2 and transport vehicle 26B-2 begin an overloading mode. Note that the hyphens-1 and -2 are intended to reflect the change in location of the same transport vehicle 26 or harvesting vehicle 24 (e.g., transport vehicle 26 located on the road is referred to as 26B-1, and at location L3, is referred to as 26B-2).

The transport vehicle 26B-1 is directed to location L3 according to one of a plurality of different ways. For instance, a dispatcher, farm manager, farm owner, or one of the operators leading the harvesting operations, is updated with current and projected fill levels and current and predicted vehicle locations of the fleet via his or her apparatus 12, and communicates instructions to an operator of the transport vehicle 26B-1 to head over to location L3 to replace transport vehicle 26A. The dispatcher, owner, manager, or operator makes an informed decision based on a visualization 32 that may reveal, using one example criteria, the closest, empty transport vehicle 26. In some embodiments, the app may automatically make the determination of which transport vehicle 26 to send as a replacement and communicate (without human intervention) a message (e.g., text message, email, automated phone call, etc.) to the operator of the transport vehicle 26B-1 (or in the case of autonomous vehicles, to the navigational system of the transport vehicle 26B-1). The operator of the transport vehicle 26B-1, having the same visualization, may make a determination as to the best route to reach the location L3, which may be aided by information determined by the app associated with the transport vehicle 26B-1 (or in some embodiments, by similar functionality in the server 18 or by the app associated with the transport vehicle 26A) that determines the fastest and/or safest route to L3. In some embodiments, the server 18 or app on the apparatuses 12 may make a determination of a preferred route (e.g., without human intervention) to replace the transport vehicle 26 that is at capacity. In the meantime, the transport vehicle 26A heads to the silo to offload the crop material, all the while providing status information to the server 18 (e.g., informing of wait times, silo occupancy, road hazards, etc.).

For the harvesting vehicle 24B-1 and transport vehicle 26C at location L2, the visualization 32B-1 for the apparatus 12 associated with the transport vehicle 26C shows a fill level at 30%, and the app associated with the apparatus 12 predicts that the transport vehicle 26C will be at 100% fill level (as shown by visualization 34B-2) at location L4. Thereby the time/distance that both vehicles are moving in headland (indicated by the diverging and curved path sections S1 and S2) is omitted from the prediction. As similarly described above, the apparatus 12 at L2 communicates the current and projected fill levels, GNSS information, etc., to the server 18, which in turn provides this information (as well as similar information from other apparatuses 12 in the harvest logistics system 22) to all of the apparatuses 12 of the harvest logistics system 22. An operator, owner, manager, or dispatcher may use this information to decide (or, as explained above, the system may make this determination) that empty transport vehicle 26D-1, returning from the silo, should be directed to location L4 to replace the transport vehicle 26C. Thus, at location L4, the transport vehicle 26D-2 now cooperates with harvesting machine 24B-2 in an overloading mode. In some embodiments, the app on one of the apparatuses 12 (e.g., of the apparatus 12 associated with the transport vehicle 26D-1, or associated with the transport vehicle 26C) may automatically select transport vehicle 26D-1 based on proximity, availability, and/or other criteria. Note also that the apps associated with apparatuses 12 for some vehicles may provide other information to the server 18 for publication to the fleet, including the fact that harvesting vehicle 24C and transport vehicle 26E are inactive. The status information may include the state (active, inactive), and in some embodiments, the reason for inactivity and an estimate of when these vehicles may be available. Additional information that may be presented on a visualization 32 are as explained above.

Note that, though certain embodiments described above include the determination and sending (to the server 18) of current and projected fill levels (and corresponding locations and related information), in some embodiments, projected fill levels and predicted locations for those projections may be omitted (and current location and heading information, among other information) may be determined and sent to the server 18. In this case, when published as feedback to the apparatuses 12 in and around the field 28, operators or a dispatcher (or farm owner, manager, or lead operator) may make their own decision based on this data when and where to send the replacement transport vehicle (or in some embodiments, functionality of the server 18 may make such determinations).

Figure 3:
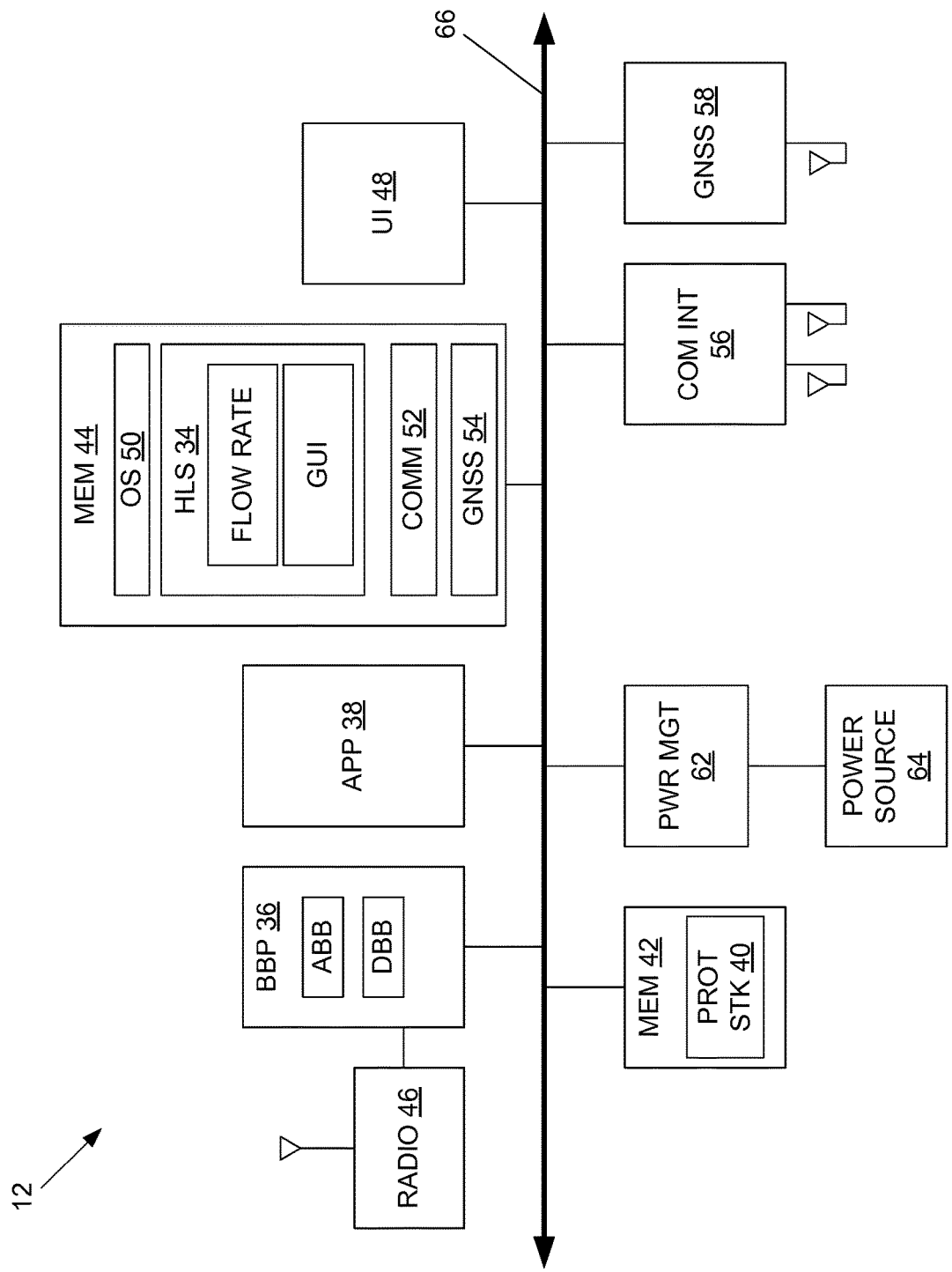
FIG. 3 is a schematic diagram that illustrates an embodiment of an example apparatus that may be used in an embodiment of a harvest logistics system.

FIG. 3 is a schematic diagram that illustrates an embodiment of an example apparatus 12 that may be used in a harvest logistics system. In the depicted example, the apparatus 12 is embodied as a smartphone, though in some embodiments, other types of devices may be used, including a laptop, notebook, tablet, device integrated into a console of the harvesting vehicle 24 or transport vehicle 26, etc. In some embodiments, all of a portion of the functionality of the apparatus 12 may be integrated in the server 18. In some embodiments, apparatus 12 may be connected to use the display of a transport vehicle or a harvesting vehicle for visual or audio representation (such as MirrorLink or Android Auto or Apple CarPlay). It should be appreciated by one having ordinary skill in the art that the logical block diagram depicted in FIG. 3 and described below is illustrative of one example, and that other designs may be used in some embodiments. The apparatus 12 comprises an app referred to as harvest logistics software (HLS) 34, which as described further below, performs mass flow determinations for the transfer of harvested crop material from a harvesting vehicle 24 to a transport vehicle 26 and communicates this fill level, location information, and an anticipated or predicted location at a projected 100% capacity, along with other information, to a server 18 (or group of servers) that may collect similar information from other transport vehicles 26 working a field or fields. The harvest logistics software 34 further comprises a graphical user interface (GUI) component that receives field map information and the information from the server 18, which the server 18 collects from the harvest logistics software 34 and other apparatuses 12 running the harvest logistics software 34 in or around the field. The GUI component of the harvest logistics software 34 enables a visualization of the status of other vehicles and field or road features (e.g., using farm management information systems) and fill levels to enable intelligent decisions on logistics in and around the field. In one embodiment, the harvest logistics software 34 uses GNSS-based (parallel path, proximity) mass flow rate determinations, observation/timer-based mass flow rate determinations, or user-input-based (or memory access-based) mass flow rate determinations, or some combination thereof. In other words, in some embodiments, the GUI component provides data fields or menus that are used to enable operator entry or selection of mass flow rate (e.g., average mass flow rate) or other parameters (e.g., map data, working width of harvester, etc.) for use in computing mass flow rate.

The apparatus 12 comprises at least two different processors, including a baseband processor (BBP) 36 and an application processor (APP) 38. As is known, the baseband processor 36 primarily handles baseband communication-related tasks and the application processor 38 generally handles inputs and outputs and all applications other than those directly related to baseband processing, though the processors 36, 38 may cooperate where the harvest logistics software 34 requires data exchange or access via cellular communications. The baseband processor 36 comprises a dedicated processor for deploying functionality associated with a protocol stack (PROT STK) 40, such as a GSM (Global System for Mobile communications) protocol stack, among other functions. The application processor 38 comprises a multi-core processor for running applications, including the harvest logistics software 34. The baseband processor 36 and application processor 38 have respective associated memory (e.g., MEM) 42, 44, including random access memory (RAM, including DRAM, SRAM, SDRAM, etc.) and nonvolatile memory elements (e.g., ROM, Flash, solid state, EPROM, EEPROM, etc.). etc., and peripherals, and a running clock. Note that, though depicted as residing in memory 44, all or a portion of the harvest logistics software 34 may be stored in memory 42, distributed among memory 42, 44, or reside in other memory. Memory 42, 44 is also each referred to herein as a non-transitory computer readable (storage) medium. In some embodiments, the memory 42, 44 may comprise additional information, including field maps, device identifiers of other apparatuses 12 (e.g., MAC address, service set identifier (SSID), cellular numbers, IP addresses, etc.), and capacities/specifications/identifiers (e.g., working width of one or more harvesting vehicles 24, header output) of the harvesting vehicles 24 and/or transport vehicles 26, including mass flow rates, header sizes/capacities, transport vehicle storage capacity, etc.

The baseband processor 36 and application processor 38 each or collectively may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other known electrical configurations comprising discrete elements both individually and in various combinations to coordinate the overall operation of the apparatus 12.

The baseband processor 36 may deploy functionality of the protocol stack 40 to enable the apparatus 12 to implement one or a plurality of cellular and/or wireless network technologies, including WCDMA (Wideband Code Division Multiple Access), CDMA (Code Division Multiple Access), EDGE (Enhanced Data Rates for GSM Evolution), broadband (e.g., 3G, 4G, 5G), GPRS (General Packet Radio Service), streaming services (e.g., LoRa), and/or LTE (Long Term Evolution), among variations thereof and/or other telecommunication protocols, standards, and/or specifications. The harvest logistics software 34 may deploy the functionality of the protocol stack 40, such as through cooperation with the baseband processor 36 or otherwise, to access or generally, receive information from, and transmit information to, the server 18, or in some embodiments, to and from other apparatuses 12 in and around the field 28 over the wireless/cellular network 14.

The baseband processor 36 manages radio communications and control functions, including signal modulation, radio frequency shifting, and encoding. The baseband processor 36 comprises, or may be coupled to, a communications interface in the form of a radio (e.g., RF front end) 46 (e.g., a cellular modem, including for instance a GSM modem), and analog and digital baseband circuitry (ABB, DBB, respectively in FIG. 3). The radio 46 comprises one or more antennas, a transceiver, and a power amplifier to enable the receiving and transmitting of signals of a plurality of different frequencies, enabling access to the wireless/cellular network 14 (FIG. 3), and hence sending information to, and receiving information from, the server(s) 18. The analog baseband circuitry is coupled to the radio 46 and provides an interface between the analog and digital domains of the GSM modem (and/or cellular modem of other standards/specifications/protocols). The analog baseband circuitry comprises circuitry including an analog-to-digital converter (ADC) and digital-to-analog converter (DAC), as well as control and power management/distribution components and an audio codec to process analog and/or digital signals received indirectly via the application processor 38 or directly from a user interface (UI) 48 (e.g., microphone, speaker, earpiece, ring tone, vibrator circuits, display screen, etc.). The ADC digitizes any analog signals for processing by the digital baseband circuitry. The digital baseband circuitry deploys the functionality of one or more levels of the GSM protocol stack (e.g., Layer 1, Layer 2, etc.), and comprises a microcontroller (e.g., microcontroller unit or MCU, also referred to herein as a processor) and a digital signal processor (DSP, also referred to herein as a processor) that communicate over a shared memory interface (the memory comprising data and control information and parameters that instruct the actions to be taken on the data processed by the application processor 38). The MCU may be embodied as a RISC (reduced instruction set computer) machine that runs a real-time operating system (RTIOS), with cores having a plurality of peripherals (e.g., circuitry packaged as integrated circuits) such as RTC (real-time clock), SPI (serial peripheral interface), I2C (inter-integrated circuit), UARTs (Universal Asynchronous Receiver/Transmitter), devices based on IrDA (Infrared Data Association), SD/MMC (Secure Digital/Multimedia Cards) card controller, keypad scan controller, and USB devices, GPRS crypto module, TDMA (Time Division Multiple Access), smart card reader interface (e.g., for the one or more SIM (Subscriber Identity Module) cards), timers, and among others. For receive-side functionality, the MCU instructs the DSP to receive, for instance, in-phase/quadrature (I/Q) samples from the analog baseband circuitry and perform detection, demodulation, and decoding with reporting back to the MCU. For transmit-side functionality, the MCU presents transmittable data and auxiliary information to the DSP, which encodes the data and provides the encoded data to the analog baseband circuitry (e.g., converted to analog signals by the DAC).

The application processor 38 operates under control of an operating system (OS) 50 that enables the implementation of one or a plurality of applications, including the harvest logistics software 34, communications software 52, and GNSS software 54. The application processor 38 may be embodied as a System on a Chip (SOC), and may support web browsing functionality to access devices of the Internet (e.g., a web server of the servers 18). For instance, the application processor 38 may execute the communications software 52, which may include middleware (e.g., browser with or operable in association with one or more application program interfaces (APIs)) to enable access to a cloud computing framework or other networks to provide remote data access/storage/processing, and through cooperation with an embedded operating system, access to calendars, location services, field map services (e.g., farm management information system), etc. In some embodiments, the communications software 52 may cooperate with radio 46 to provide for satellite services. Explaining further, in some embodiments, the communications software 52 works in conjunction with the communications interface 56 and/or radio 46 to receive and transmit data over the wireless/cellular network 14. The communications software 52 may enable communications via one or more of WCDMA (Wideband Code Division Multiple Access), CDMA (Code Division Multiple Access), EDGE (Enhanced Data Rates for GSM Evolution), broadband (e.g., 3G, 4G, 5G), streaming services (e.g., LoRa), GPRS (General Packet Radio Service), Zigbee (e.g., based on IEEE 802.15.4), Bluetooth, Wi-Fi (Wireless Fidelity, such as based on IEEE 802.11), and/or LTE (Long Term Evolution), among variations thereof and/or other telecommunication protocols, standards, and/or specifications.

The application processor 38 generally comprises a processor core (Advanced RISC Machine or ARM), and further comprises or may be coupled to multimedia modules (for decoding/encoding pictures, video, images, and/or audio), a graphics processing unit (GPU), a communications interface (COM INT) 56 (e.g., for enabling wireless functionality, including Bluetooth, wireless fidelity, etc.), and device interfaces. For instance, the communications software 52, executing on the application processor 38, may comprise low-range communications functionality that is used in conjunction with the communications interface 56, to enable wireless, peer-to-peer communications with other apparatuses 12 in some embodiments. In some embodiments, cellular functionality is achieved via the harvest logistics software 34 working in cooperation with the protocol stack 40, radio 46, and communications software 52. Note that in some embodiments, a communications interface as used herein includes the radio 46, communications software 52, protocol stack 40, and communications interface 56 in some embodiments.

In one embodiment, the communication interface 56 and communications software 52 cooperate to provide one or more wireless services, including Zigbee (e.g., based on IEEE 802.15.4), Bluetooth, Wi-Fi (Wireless Fidelity, such as based on IEEE 802.11), etc. The application processor 38 is further coupled to (though in some embodiments, may incorporate) a global navigation satellite systems transceiver or receiver (GNSS) 58, which in cooperation with GNSS software 54, enables access to a satellite network to, for instance, provide coordinate location services and heading information for the apparatus 12. In some embodiments, the GNSS receiver 58, in association with the GNSS software 54, collects parameters pertaining to current time and location data and/or heading data for the apparatus 12, including location coordinates, altitude, and velocity. In some embodiments, location and/or heading data may be acquired using other techniques, including via inertial mechanisms using, for instance, an inertial guidance system (e.g., accelerometer, gyroscope, and/or magnetometer) or triangulation techniques from cellular and/or wireless signals. The GNSS receiver 58 may be configured according to global positioning system (GPS) functionality, GLONASS, among others.

The device interfaces coupled to the application processor 38 may include the user interface 48, which may include a display screen. The display screen may be embodied in one of several available technologies, including LCD or Liquid Crystal Display (or variants thereof, such as Thin Film Transistor (TFT) LCD, In Plane Switching (IPS) LCD)), light-emitting diode (LED)-based technology, such as organic LED (OLED), Active-Matrix OLED (AMOLED), or retina or haptic-based technology.

The harvest logistics software 34 provides feedback via its GUI component to all in possession of the apparatuses 12 used in a harvest logistics system. As explained above, the GUI component provides a rendering of a browser-based web page or a locally-generated map (visualization) showing the field(s) 28, roadways 30, and harvesting vehicles 24 and transport vehicles 26 along with various field or roadway features, statuses of the vehicles, distances, current and projected fill levels, location (current, predicted) coordinates, among other information. The information presented on the user interface 48 may be provided by the server 18 based on collection of information from apparatuses 12 associated with the field 28, as explained above. In one embodiment, the visualization provided by the GUI component may comprise features similar to that shown in FIG. 2.

The user interface 48 is described in the context of a display screen, though it should be appreciated by one having ordinary skill in the art, in the context of the present disclosure, that the user interface 48 may comprise other and/or additional mechanisms for providing feedback, including using audible feedback (e.g., using a headset or speaker, or an HMI tone that alerts the operator when headlands are encountered) and/or tactile feedback (e.g., using a vibratory motor that alerts the operator when, for instance, a fill level has reached a particular (e.g., threshold) level, or when headlands are encountered, or different visuals (e.g., different colored lights or symbols presented on the display screen that alert the operator to points of interest or points of danger, oncoming traffic alerts, etc.). In one embodiment, the user interface 48 comprises a microphone, which as explained above, may be used to sense when a vehicle is at a headlands (and hence not harvesting crop material).

Referring again to FIG. 3, also included in the apparatus 12 is a power management device 62 that controls and manages operations of a power source (e.g., battery) 64. The components described above and/or depicted in FIG. 3 share data over one or more busses, and in the depicted example, via data bus 66. It should be appreciated by one having ordinary skill in the art, in the context of the present disclosure, that variations to the above example description of the apparatus 12 may be deployed in some embodiments to achieve similar functionality.

In the depicted embodiment, the application processor 38 runs the harvest logistics software 34, which in one embodiment, includes a plurality of software modules (e.g., executable code/instructions) to carry out all or a portion of the functionality of a harvest logistics system. Execution of the software 34 may be implemented by the processor 38 (and/or processor 36) under the management and/or control of the operating system 50. In one embodiment, the harvest logistics software 34 comprises the (mass or material) flow rate module and the GUI component (module). Note that functionality of these modules may be combined into fewer modules or extended among additional modules, or distributed among plural devices in some embodiments.

When certain embodiments of the apparatus 12 are implemented at least in part as software (including firmware), it should be noted that the software can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiment of the apparatus 12 are implemented at least in part as hardware, such functionality may be implemented with any or a combination of the following technologies, which are all known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 4:
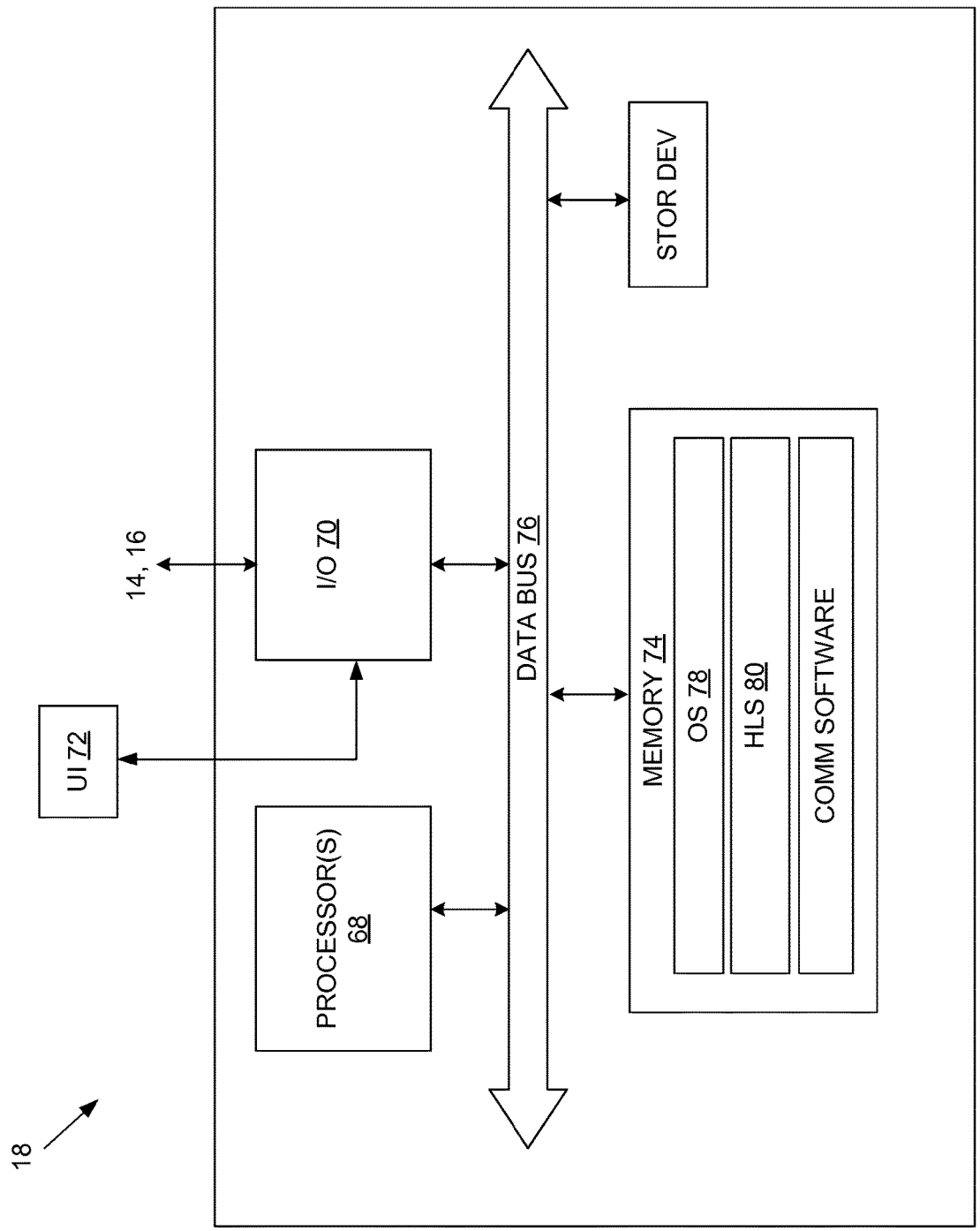
FIG. 4 is a block diagram that illustrates an embodiment of an example server that may be used in an embodiment of an example harvest logistics system.

FIG. 4 is a block diagram that illustrates an embodiment of an example server 18 that may be used in an embodiment of an example harvest logistics system. Though described as implementing certain functionality of a harvest logistics system, in some embodiments, such functionality may be distributed among plural devices (e.g., using plural, distributed processors) that are co-located or geographically dispersed. In some embodiments, functionality of the server 18 may be implemented in another device, including a programmable logic controller, ASIC, FPGA, among other processing devices. It should be appreciated that certain well-known components of computers are omitted here to avoid obfuscating relevant features of server 18. In one embodiment, the server 18 comprises one or more processors, such as processor 68, input/output (I/O) interface(s) 70, a user interface 72, and memory 74, all coupled to one or more data busses, such as data bus 76. The memory 74 may include any one or a combination of volatile memory elements (e.g., random-access memory RAM, such as DRAM, and SRAM, etc.) and nonvolatile memory elements (e.g., ROM, hard drive, tape, CDROM, etc.). The memory 74 may store a native operating system, one or more native applications, emulation systems, or emulated applications for any of a variety of operating systems and/or emulated hardware platforms, emulated operating systems, etc. In the embodiment depicted in FIG. 4, the memory 74 comprises an operating system 78 and harvest logistics software (HLS) 80. In some embodiments, one or more functionality of the harvest logistics software 80 may be implemented in hardware. It should be appreciated by one having ordinary skill in the art that in some embodiments, additional or fewer software modules (e.g., combined functionality) may be employed in the memory 74 or additional memory. In some embodiments, a separate storage device may be coupled to the data bus 76, such as a persistent memory (e.g., optical, magnetic, and/or semiconductor memory and associated drives).

The processor 68 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the server 18.

The I/O interfaces 70 provide one or more interfaces to the networks 14, 16. In other words, the I/O interfaces 70 may comprise any number of interfaces for the input and output of signals (e.g., analog or digital data) for conveyance over one or more communication mediums.

The user interface (UI) 72 may be a keyboard, mouse, microphone, touch-type display device, head-set, and/or other devices that enable visualization of the contents and/or container as described above. In some embodiments, the output may include other or additional forms, including audible or on the visual side, rendering via virtual reality or augmented reality based techniques.

Note that in some embodiments, the manner of connections among two or more components may be varied. Further, the server 18 may have additional software and/or hardware, including communications (COMM) software that formats data according to the appropriate format to enable transmission or receipt of communications over the networks and/or wireless or wired transmission hardware (e.g., radio hardware).

The harvest logistics software 80 comprises executable code/instructions that, when executed by the processor 68, causes the processor 68 to collect information from the apparatuses 12, and populate a field map with data corresponding to the information (e.g., current and projected fill levels, GNSS data, predicted locations and other field and/or roadway features, etc.) provided by the apparatuses 12 for an entire vehicle fleet of a harvest logistics system. In some embodiments, some of the field map and road information may be rendered based on known farm management information system functionality, as described above. In some embodiments, the harvest logistics software 80 may perform one or more functionality described above for the harvest logistics software 34 (FIG. 3). In one embodiment, the harvest logistics software 80 comprises web-server functionality to provide a rendering of a field map and information about a field, nearby roadways, and vehicles in and about the field and roadways. In some embodiments, the same information may be provided (e.g., broadcast) to the apparatuses 12 for local rendering of the same.

Execution of the harvest logistics software 80 is implemented by the processor 68 under the management and/or control of the operating system 78. In some embodiments, the operating system 78 may be omitted. In some embodiments, functionality of harvest logistics software 80 may be distributed among plural computing devices (and hence, plural processors).

When certain embodiments of the server 18 are implemented at least in part with software (including firmware), as depicted in FIG. 4, it should be noted that the software can be stored on a variety of non-transitory computer-readable medium (including memory 74) for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiments of the server 18 are implemented at least in part with hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 5:
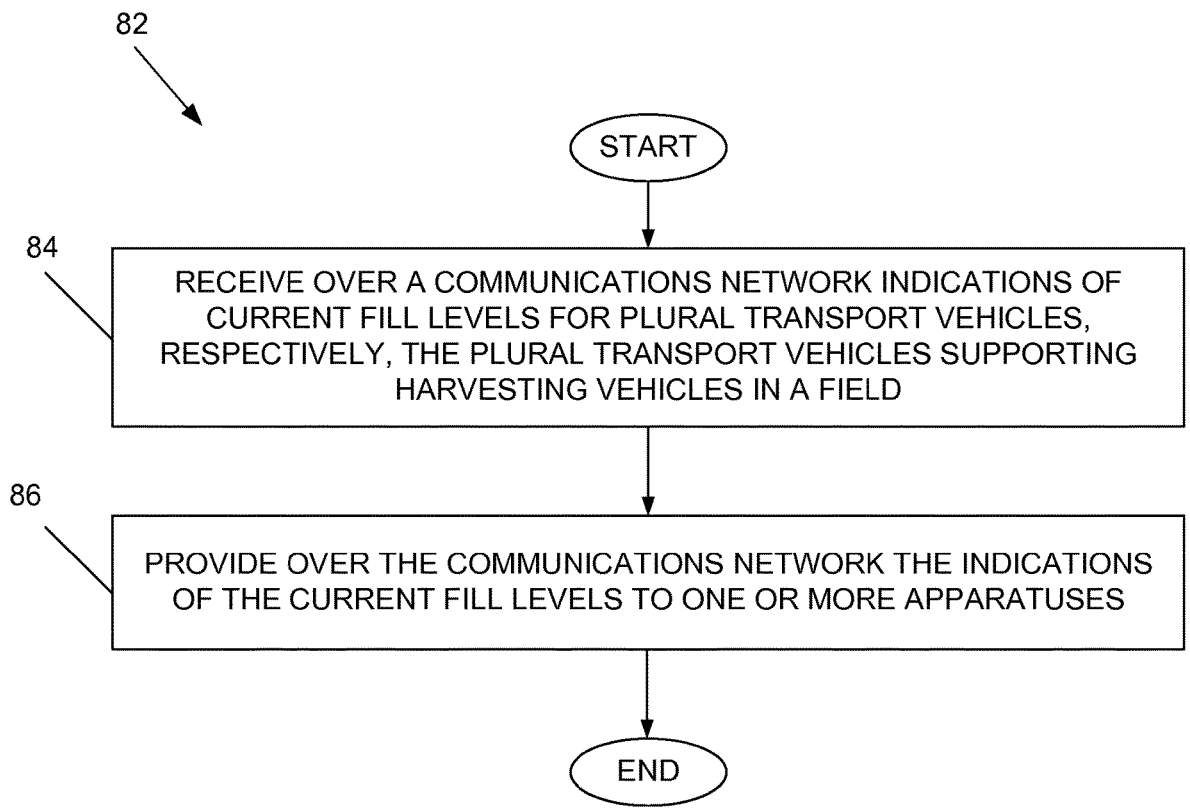
FIG. 5 is a flow diagram that illustrates an embodiment of an example harvest logistics method implemented at one or more servers.

Having described certain embodiments of a harvest logistics system and method, it should be appreciated within the context of the present disclosure that one embodiment of a harvest logistics method, denoted as method 82 and implemented by one or more processors executing the harvest logistics software 80 (e.g., of the server 18) as illustrated in FIG. 5, comprises receiving over a communications network indications of current fill levels for plural transport vehicles, respectively, the plural transport vehicles supporting harvesting vehicles in a field (84); and providing over the communications network the indications of the current fill levels to one or more apparatuses (86).

Figure 6:
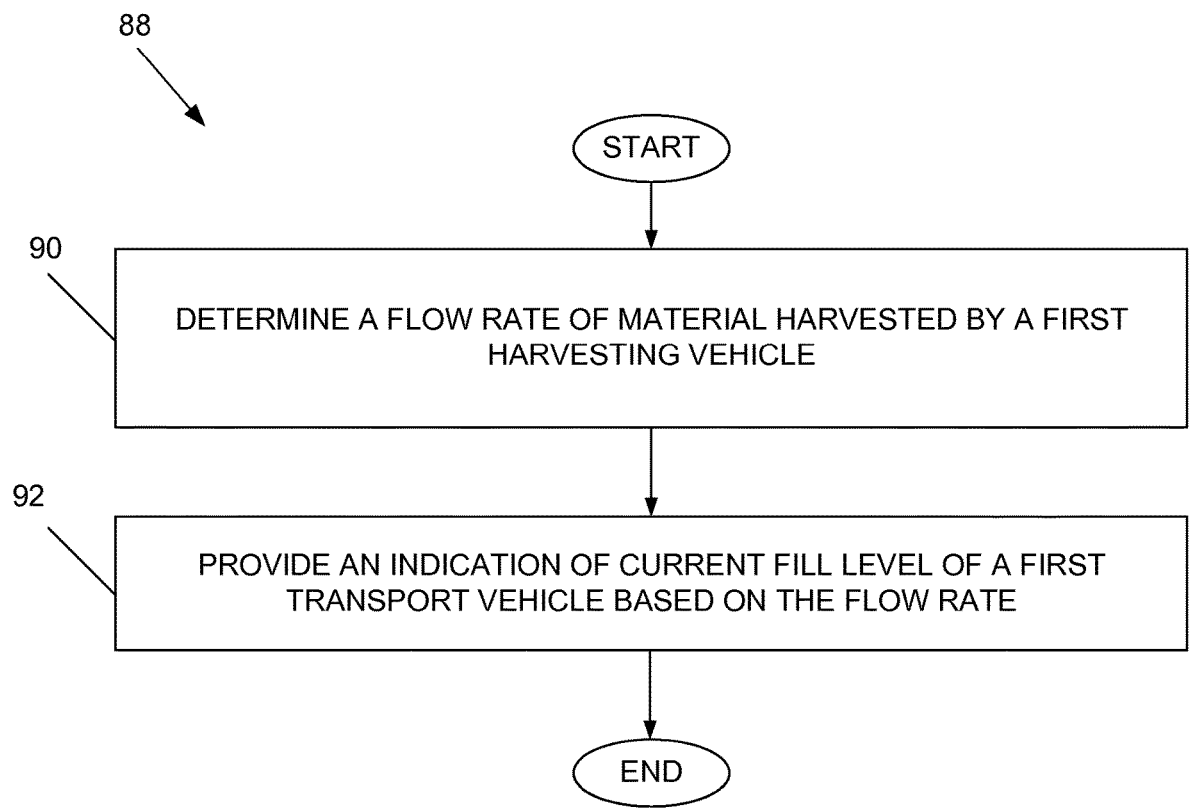
FIG. 6 is a flow diagram that illustrates another embodiment of an example harvest logistics method implemented at an apparatus.

FIG. 6 is a flow diagram that illustrates another embodiment of an example harvest logistics method 88 implemented by one or more processors at an apparatus 12. In one embodiment, the method 88 comprises determining a flow rate of material harvested by a first harvesting vehicle (90); and providing an indication of current fill level of a first transport vehicle based on the flow rate (92).

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure, particularly, any "preferred" embodiments, are merely possible examples of implemen-

The invention claimed is:

1. A system comprising:
a first portable electronic device carried on an agricultural harvester, the first portable electronic device including a positioning component for determining a first geographic position of the first portable electronic device; and
a second portable electronic device carried on a crop transport vehicle, the second portable electronic device including a positioning component for determining a second geographic position of the second portable electronic device;
at least one of the first portable electronic device and the second portable electronic device being configured to
receive the geographic position of the other portable electronic device, using only the first geographic position and the second geographic position, identify a harvesting operation performed by the agricultural harvester,
determine a harvesting distance, a harvesting duration of time, or both of the harvesting operation, and
estimate a current fill level of the crop transport vehicle based on the harvesting distance, the harvesting duration of time, or both.

2. The system as set forth in claim 1, the at least one of the first portable electronic device and the second portable electronic device being further configured to
determine a first movement path of the first portable electronic device and a second movement path of the second portable electronic device based on the first and second geographic positions, and
identify the harvesting operation using a predetermined threshold distance between the first and second geographic positions and a parallel pathway of the first and second movement paths indicating the harvesting operation.

3. The system as set forth in claim 1, the at least one of the first portable electronic device and the second portable electronic device being further configured to
determine a change in the fill level of the crop transport vehicle based on the harvesting distance, harvesting duration of time, or both, and
using the first and second geographic positions and the change in the fill level of the crop transport vehicle, estimate a location where the fill level of the crop transport vehicle will reach maximum capacity.

4. The system as set forth in claim 1, the at least one of the first portable electronic de-ice and the second portable electronic device being further configured to
determine a change in the fill level of the crop transport vehicle based on the harvesting distance, harvesting duration of time, or both, and
using the first and second geographic positions and the change in the fill level of the crop transport vehicle, estimate a time when the fill level, of the crop transporter will reach maximum capacity.

5. The system as set forth in claim 4, the at least one of the first portable electronic device and the second portable electronic device being further configured to
generate a graphical user interface,
present on the graphical user interface a map, and
present on the map a visual indication of one or more of the estimated current fill levels of the crop transport vehicle, the estimated location where the fill level of the crop transport vehicle will reach maximum capacity and the estimate time when the fill level of the crop transport vehicle will reach maximum capacity.

6. The system as set forth in claim 1, the at least one of the first portable electronic device and the second portable electronic device being further configured to
determine a mass flow rate based on user input and a capacity of the crop transport vehicle, and
use the mass flow rate to estimate the current fill level of the crop transport vehicle.

7. The system as set forth in claim 1, the at least one of the first portable electronic device and the second portable electronic device being further configured to estimate the fill level of the crop transport vehicle based on the harvesting distance or the harvesting duration of time while omitting from the determination a distance or time, respectively, for non-harvesting conditions.

8. The system as set forth in claim 1, the at least one of the first portable electronic device and the second portable electronic device being further configured to determine that the first and second geographic positions indicate a harvesting operation by determining that the crop transport vehicle is within a virtual area associated with the harvester.

9. The system as set forth in claim 1, the at least one of the first portable electronic device and the second portable electronic device being further configured to determine that the first and second geographic positions indicate a harvesting operation by determining that a virtual area associated with the harvester overlaps a virtual area associated with the crop transport vehicle.

10. The system as set forth in claim 1, the at least one of the first portable electronic device and the second portable electronic device being further configured to determine that the first and second geographic positions indicate a harvesting operation by determining that a reference point associated with the harvester is within a relative distance to a reference point associated with the crop transport vehicle.

11. The system as set forth in claim 1, the at least one of the first portable electronic device and the second portable electronic device being further configured to
determine harvester mass flow information based on a total harvesting distance traveled, or a total harvesting duration of time, that the crop transport vehicle and the agricultural harvester followed parallel paths and the fill level of the crop transport vehicle filled up from an empty state to a maximum capacity, and
use the harvester mass flow information to estimate the current fill level of the crop transport vehicle.

12. The system as set forth in claim 11, the at least one of the first portable electronic device and the second portable electronic device being further configured to determine the harvester mass flow information based on the total harvesting distance traveled, or the total harvesting duration of time, while omitting from the determination a distance or time, respectively, for non-harvesting conditions.

13. The system as set forth in claim 11, the at least one of the first portable electronic device and the second portable electronic device being further configured to determine a maximum harvesting distance, a maximum harvesting time or both that is required to fill up the transport vehicle from an empty fill level to a full fill level during a harvesting operation, and use the maximum harvesting distance, the maximum harvesting time or both as a measure of the maximum capacity of the crop transport vehicle when estimating the current fill level of the crop transport vehicle.

14. A method comprising:

determining, using a first portable electronic device carried on one of an agricultural harvester or a crop transport vehicle, a first geographic position corresponding to the first portable electronic device;

receiving, at the first portable electronic device, a second geographic position corresponding to a second portable electronic device carried on the other of the agricultural harvester or the crop transport vehicle;

automatically identifying, using the first portable electronic device and using only the first geographic position and the second geographic position, a harvesting operation performed by the agricultural harvester;

automatically determining, using the first portable electronic device, a harvesting distance, a harvesting duration of time, or both of the harvesting operation; and automatically estimating, using the first portable electronic device, a current fill level of the crop transport vehicle based on the harvesting distance, the harvesting duration of time, or both.

15. The method as set forth in claim 14, the first portable electronic device being further configured to determine a first movement path of the first portable electronic device and a second movement path of the second portable electronic device based on the first and second geographic positions, and identify the harvesting operation using a predetermined threshold distance between the first and second geographic positions and a parallel pathway of the first and second movement paths indicating the harvesting operation.

16. The method as set forth in claim 14, the first portable electronic device being further configured to determine a change in the fill level of the crop transport vehicle based on the harvesting distance, harvesting duration of time, or both, and using the first and second geographic positions and the change in the fill level of the crop transport vehicle, estimate a location, a time or both where the fill level of the crop transport vehicle will reach maximum capacity.

17. The method as set forth in claim 14, the first portable electronic device being further configured to estimate the fill level of the crop transport vehicle based on the harvesting distance or the harvesting duration of time while omitting from the determination a distance or time, respectively, for non-harvesting conditions.

18. The method as set forth in claim 14, the first portable electronic device being further configured to determine that the first and second geographic positions indicate a harvesting operation by determining that the crop transport vehicle is within a virtual area associated with the harvester.

19. The method as set forth in claim 14, the first portable electronic device being further configured to determine that the first and second geographic positions indicate a harvesting operation by determining that a reference point associated with the harvester is within a relative distance to a reference point associated with the crop transport vehicle.

20. The method as set forth in claim 14, the first portable electronic device being further configured to determine harvester mass flow information based on a total harvesting distance traveled, or a total harvesting duration of time, that the crop transport vehicle and the agricultural harvester followed parallel paths and the fill level of the crop transport vehicle filled up from an empty state to a maximum capacity, and use the harvester mass flow information to estimate the current fill level of the crop transport vehicle.

* * * * *